United States Patent Office 3,007,908
Patented Nov. 7, 1961

---

3,007,908
PROCESS FOR PREPARING HIGH MOLECULAR POLYETHYLENES
Roderich Graf, Frankfurt am Main, and Ernst Jacob, Hofheim (Taunus), Germany, assignors to Farbwerke Hoechst Aktiengesellschaft vormals Meister Lucius & Brüning, Frankfurt am Main, Germany, a corporation of Germany
No Drawing. Filed Feb. 17, 1956, Ser. No. 566,071
Claims priority, application Germany Feb. 19, 1955
12 Claims. (Cl. 260—94.9)

The present invention relates to a process for preparing high molecular polyethylenes.

From Belgian Patent 533,362, Belgian Patent 534,792, and Belgian Patent 534,888, it is known to prepare high molecular polyethylenes by bringing ethylene into contact with mixtures of organo-metallic compounds and salts of titanium, zirconium, hafnium, vanadium, niobium, chromium, molybdenum, tungsten, thorium and uranium under relatively mild conditions of pressure and temperature. Mixtures of organo-aluminum compounds and titanium tetrahalides or zirconium tetrahalides have proved especially efficacious for starting the polymerization.

It has been observed, however, that with the use of ethylene of a different origin different products are obtained and that the polymerization velocity of the ethylene in some cases does not reach but unsatisfactory values, or is soon reduced to an order which does not satisfy industrial requirements, without it having been first possible to explain these phenomena.

Now we have found that ethylene with a catalyst system from organo-aluminum compounds and metal compounds of titanium, zirconium, hafnium, vanadium, niobium, tantalum, chromium, molybdenum, tungsten, thorium and uranium can be polymerized using a reaction mixture, into which are constantly introduced small amounts of oxygen of 0.005 to 0.5, preferably 0.005 to 0.05 percent by volume, calculated upon the volume of the ethylene. The oxygen may be added to the reaction mixture separately or it may be admixed to the ethylene. If ethylene is used which has been completely freed from oxygen by physical or chemical methods, it is possible again to obtain high polymerization velocities by admixing oxygen, i.e. in a small proportion as indicated above.

As organo-aluminum compounds there may be used trialkyl-aluminum compounds, wherein the methyl-, ethyl-, propyl-, butyl-, isopropyl-, isobutyl- or any other aliphatic radical containing up to 8 carbon atoms, or mixtures of these radicals, may be present in the trialkyl-compound.

It is also possible to use alkyl-aluminum halides of the general formula:

$$AlR_mHal_n$$

wherein R represents an aliphatic radical containing 1 to 8 carbon atoms, Hal represents chlorine and bromine radicals, $m$ and $n$ each are a whole number of 1 or 2, and the sum of $m+n=3$. As compounds of this kind there may be mentioned more especially, for example, diethyl-aluminum-monochloride, monoethyl-aluminum-dichloride or the equimolecular mixture of these two compounds, i.e. ethyl-aluminum-sesquichloride. As compounds of the metals titanium, zirconium etc. there can be used both organic compounds, such as esters of titanium, wherein the ester group may contain 1 to 4 carbon atoms, titanium-acetonyl-acetonate or titanium chloracetate and, naturally, corresponding compounds of the other metals which have been referred to above. As inorganic compounds of the aforesaid metals titanium, zirconium, hafnium, vanadium etc. there can be used, especially, the halides, such as chlorides or bromides, for example titanium-tetrachloride.

The oxygen effect according to this invention is particularly efficacious, when the stationary molar concentration of the organo-aluminum compounds is small with respect to the titanium-III-chloride present in the reaction mixture and when the upper limit of said concentration is below the molar concentration of the titanium-III-chloride present in the reaction mixture.

Special care must be taken that by the addition of oxygen the organo-aluminum compound and, for example, the titanium-III-chloride, be not oxidized completely to form compounds which are inefficient catalysts.

To obtain optimum reaction conditions it is necessary constantly to maintain in the reaction medium a certain concentration of a reactive titanium compound, for example 1 to 20 millimols, preferably 4 to 10 millimols, of titanium compound per liter of polymerization bath, and to take care that the ethylene contains a small amount of oxygen in a proportion as indicated above.

To effect a discontinuous ethylene polymerization process it is advisable to use a polymerization contact which has been obtained as described in U.S. patent application for "Process of preparing high-molecular polyethylenes" filed by Roderich Graf, Hans Zimmermann, Herbert Bestian, Heinz-Joachim Bahr and Karl Clauss on December 16, 1955, Ser. No. 553,412 (German application F16790IVc/39c, filed February 9, 1955), by reduction of, for example, titanium-tetrachloride with an excess of an organo-aluminum compound such as has been referred to above. The products obtained by this reaction are separated and, apart from that separated precipitate, small amounts of an organo-aluminum compound, such as aluminum trialkyl, aluminum-dialkyl-chloride or a mixture of aluminum dialkyl monochloride and aluminum monoalkyl dichloride which is easily accessible in industry, and wherein the alkyl radical of all said compounds may contain 1 to 8 carbon atoms, are constantly added to the polymerization mixture. The polymerization velocity is regulated according to this invention by a current of, for example, oxygen which may be separately added. Instead of pure oxygen, it is also possible to use air. It is, however, more advantageous to adjust the ethylene used in a manner such that it contains oxygen in a proportion as has been indicated above, and then to regulate the reaction by the addition of an organo-aluminum compound. It is, however, also possible to start directly from a dilute solution, for example a solution of 0.02 to 0.1 percent strength of titanium-IV-chloride in aliphatic or cycloaliphatic saturated hydrocarbons, such as n-hexane, n-octane, cyclohexane, decahydronaphthalene, or other similar hydrocarbons or mixtures of these hydrocarbons, said mixture of hydrocarbons being required to boil between 150 and 250° C., and while gasing with an ethylene which contains small catalytically active amounts of oxygen, i.e. 0.005 to 0.05 percent by volume, there are added, at a raised temperature, for example at 40 to 90° C., small quantities of organo-aluminum compounds in a molar or submolar proportion calculated upon the titanium-tetrahalide, which is in solution, until the polymerization commences; by gasing with ethylene containing oxygen in a proportion according to this invention, the reaction is continued, while stirring well, under constant or proportional addition of small amounts of an organo-aluminum compound.

The process disclosed above can be conducted with particular advantage in a continuous operation, wherein the reaction is started as described above and small amounts of titanium compound and an organo-aluminum compound are constantly added to the reaction mixture, i.e. in the form of a dilute solution for example of 1 to 10 percent strength, or these components together with a detached partial current of ethylene are introduced into the reaction mixture in the form of a gas. With the aid of a separate ethylene partial current the small amounts of oxygen referred to above are constantly introduced into the reaction mixture which is intensively stirred and kept at a temperature between about 40 and 90° C. by cooling; after these amounts of oxygen have been introduced into the apparatus, part of the reaction mixture is constantly withdrawn and the reaction volume is kept constant by means of a fresh or regenerated solvent which constantly runs in and to which the titanium compound or the organo-aluminum compound may be directly incorporated.

The main object of this invention is based on the fundamental perception that the polymerization velocity of the ethylene depends substantially on the concentration of oxygen in the ethylene, the determination of the quantitative limit of the optimum concentration of oxygen being of secondary importance. The quantitative order of the optimum oxygen concentration appears to depend substantially on the kind of the organo-aluminum compound used. When aluminum-diethyl-monochloride or aluminum-ethyl-sesquichloride is used, the most favorable concentration of oxygen amounts to about 0.01 to 0.04 percent by volume.

It has also been found that—apart from the polymerization velocity—it is also the molecular weight of the polyethylene formed which depends on the content of oxygen of the ethylene used. The molecular weight is influenced by the oxygen content of the ethylene in a manner such that a higher content of oxygen gives rise to the formation of polyethylenes of low molecular weight; said content of oxygen as is understood is still below that limit at which the reaction is interrupted. By reducing the content of oxygen which, on the other hand, is associated with a reduction of the polymerization velocity, and otherwise maintaining the same reaction conditions, high molecular polyethylene is formed, if the reduced viscosity $\eta$ spec./c., determined, for example, with a solution of 0.5 percent strength of the products in tetrahydronaphthalene as a solvent at 120°, is taken as measure unit of the molecular weight. These data enable the desired effect to be easily attained by the expert.

The following examples serve to illustrate the invention, but they are not intended to limit it thereto, the parts being by weight unless otherwise stated and the relationship of parts by weight to parts by volume being the same as that of the kilogram to the liter.

*Example 1*

Ethylene with a content of oxygen of 0.02 percent by volume is introduced, at 70–80° C., while stirring intensively, into a suspension of 0.4 part of a titanium-III-chloride catalyst in 400 parts of a mixture of saturated, preferably, aliphatic hydrocarbons boiling between 200 and 220° C., while catalyst has been prepared as described in Example 1 of the aforementioned U.S. patent application. After the addition of a solution of about 0.2 part of aluminum-diethyl-monochloride to the aforesaid mixture of hydrocarbons, reaction commences rapidly with an absorption of about 30 to 35 parts by volume of ethylene per hour and is kept constant on this level by adding, per hour, a solution corresponding to 0.06 part of aluminum-diethyl-monochloride. After 4 hours of reaction, the well stirrable mixture is filtered off with suction, and the product is freed from the adhering solvent and the residual catalyst by treating it with acetone and dilute nitric acid. After drying, 140 parts of polyethylene are obtained in the form of a white finely gritty powder of a bulk weight of 330 g./liter. The reduced viscosity is 2.4 determined with a solution of 0.5 percent strength in tetrahydronaphthalene at 120° C.

When an ethylene is used which contains only 0.002 percent by volume of oxygen and otherwise the same reaction conditions are applied, that is to say when the same reaction temperature, the same concentration of catalyst, the same unit of quantity and time are observed for adding an equal amount of an organo-aluminum compound, the absorption of ethylene averages per hour only about 5 parts by volume. When the same reaction conditions are maintained, the absorption rate of ethylene increases immediately to about 30 parts by volume per hour and remains constant at that level for many hours, if small amounts of oxygen or air corresponding to a content of 0.01 percent by volume of oxygen are admixed to the ethylene at a constant velocity. When the concentration of oxygen in the ethylene is increased to reach some tenths percent or more, an extraordinarily intensive increase in the ethylene polymerization is observed which, however, lasts only a short time. A steep reduction in the absorption of ethylene soon commences until the polymerization completely ceases. The polymerization can be continued and gradually again becomes normal; only when the oxygen concentration in the ethylene is reduced to an order of 0.01 percent by volume and small amounts of the organo-aluminum compound are constantly added, it is, however, also possible to continue the polymeriation by adding at once to the starting mixture described above a greater amount of aluminum-diethyl-monochloride, for example, about 0.1 to 0.2 part.

A stronger increase of the oxygen concentration in the ethylene, however, involves no noteworthy increase in the absorption of ethylene when, with respect to the quantity of the titanium catalyst, a multiple of the molar quantity of the organo-aluminum compound is added to the starting mixture described above, i.e. about 2 or more parts. Contrary thereto, a slow reduction of the absorption of ethylene generally occurs until shortly before the complete standstill of the polymeriaztion, a less marked increase in the ethylene absorption can be observed but which increase lasts only a short time.

*Example 2*

A solution of 0.25 part of aluminum-diethyl-monochloride is run at first rather rapidly at 70° C., into a solution of 0.4 part of titanium tetrachloride in 400 parts of a mixture of hydrocarbons as described in Example 1, while at the same time ethylene containing 0.02 percent by volume of oxygen is passed through the starting mixture. Polymerization commences soon and reaches a velocity which corresponds to an absorption rate of about 30 parts by volume of ethylene per hour. The absorption remains constant for several hours by adding per hour about 0.07 part of an equimolecular mixture of aluminum-diethyl-monochloride and aluminum-diethyl-dichloride in the form of a solution in the hydrocrabon mixture used. After 4 hours, the product formed is filtered off with suction and then freed from the adhering hydrocarbon and the residual contact by treating it with acetone and dilute nitric acid. After drying, 140 parts of polyethylene are obtained in the form of a white finely pulverulent powder which has a bulk weight of 250 g./liter.

The reduced viscosity is 1.8, determined with a solution of 0.5 percent strength in tetrahydronaphthalene at 120° C.

We claim:

1. In a process for preparing high molecular weight polyethylene by polymerization of ethylene in the presence of a catalytic amount of a catalyst prepared by reacting titanium tetrachloride and an alkyl aluminum halide, separating the resulting precipitate, and activating the separated precipitate with an alkyl aluminum halide, the improvement comprising continuously introducing oxygen into the polymerization reaction mixture in an amount of 0.005 to 0.5% by volume calculated on the volume of ethylene fed into the reaction mixture, while, continuously feeding a small amount of the said alkyl aluminum halide into the polymerization reaction mixture in order to maintain a high polymerization rate and to obtain a product of uniform molecular weight during the entire polymerization time, the alkylaluminum halide being added during polymerization in such an amount that the polymerization continues with a constant rate of ethylene absorption.

2. The process of claim 1 wherein diethylaluminum monochloride is used as the alkyl aluminum halide.

3. The process of claim 1 wherein ethyl aluminum sesquichloride is used as the alkyl aluminum halide.

4. The process of claim 1 wherein the amount of oxygen is 0.005 to 0.05% by volume calculated on the volume of ethylene fed into the reaction mixture.

5. The process of claim 1 wherein the amount of oxygen is 0.02 to 0.05% by volume calculated on the volume of ethylene fed into the reaction mixture.

6. In a process for preparing high molecular weight polyethylene by polymerization of ethylene in the presence of a catalytic amount of a catalyst prepared by reacting titanium tetrachloride and an alkyl aluminum halide, separating the resulting precipitate, and activating the separated precipitate with an alkyl aluminum halide, the improvement comprising continuously introducing oxygen into the polymerization reaction mixture in an amount of 0.005 to 0.5% by volume calculated on the volume of ethylene fed into the reaction mixture, while continuously feeding an amount of the said alkyl aluminum halide into the polymerization reaction mixture, said amount of alkyl aluminum halide being sufficiently small to maintain the molar ratio of the aluminum compound to the titanium compound below 1.

7. In a process for preparing high molecular weight polyethylene by polymerization of ethylene in the presence of a catalytic amount of a catalyst prepared by reacting titanium tetrachloride and an alkyl aluminum halide, separating the resulting precipitate, and activating the separated precipitate with an alkyl aluminum halide, the improvement comprising continuously introducing oxygen into the polymerization reaction mixture in an amount of 0.005 to 0.5% by volume calculated on the volume of ethylene fed into the reaction mixture while controlling the polymerization rate by continuously introducing a small amount of the said alkyl aluminum halide into the polymerization reaction mixture in order to maintain a high polymerization rate and to obtain a product of uniform molecular weight during the entire polymerization time, the alkylaluminum halide being added during polymerization in such an amount that the polymerization continues with a constant rate of ethylene absorption.

8. The process of claim 7 wherein the alkyl aluminum halide used for activating the separated precipitate is diethylaluminum monochloride.

9. The process of claim 7 wherein the alkyl aluminum halide used for activating the separated precipitate is monoethyl aluminum dichloride.

10. The process of claim 7 wherein the alkyl aluminum halide used for activating the separated precipitate is ethyl aluminum sesquichloride.

11. A process for the manufacture of high molecular weight polyethylene which comprises introducing ethylene containing 0.02 to 0.05% by volume oxygen into 400 parts of a suspension of 0.4 to 10 millimoles per liter of titanium trichloride in a saturated alpihatic hydrocarbon, adding 0.2 to 0.25 part by weight of aluminum diethyl monochloride to the said suspension in order to start the polymerization, and introducing continuously 30 to 35 parts per hour of the oxygen-containing ethylene and 0.06 to 0.07 part per hour of aluminum diethyl monochloride into the reaction liquid in order to maintain the polymerization reaction.

12. In a process for preparing a high molecular weight polyethylene by polymerizing ethylene in the presence of oxygen and a catalytic amount of a catalyst prepared by reacting a titanium halide with an alkyl aluminum halide, separating the resulting precipitate, and activating the separated precipitate with an alkyl aluminum halide, the improvement comprising employing ethylene which contains a constant proportion of oxygen, this proportion being in the range of 0.005 to 0.5% by volume of oxygen based on the volume of ethylene fed into the reactor, while continuously introducing a small amount of said alkyl aluminum halide into the reactor, the molar concentration of the alkyl aluminum halide in the reaction mixture being maintained at less than the molar ratio of the titanium halide present therein, whereby the reaction speed can be observed by the rate of the absorption of gaseous ethylene and it is controlled by the addition of alkyl aluminum halide in such an amount that the polymerization continues with a constant rate of ethylene absorption.

References Cited in the file of this patent

UNITED STATES PATENTS

| | | |
|---|---|---|
| 2,440,498 | Young et al. | Apr. 27, 1948 |
| 2,482,877 | Schmerling | Sept. 27, 1949 |
| 2,658,059 | Peters et al. | Nov. 3, 1953 |
| 2,692,261 | Peters et al. | Oct. 19, 1954 |
| 2,822,357 | Brebner et al. | Feb. 4, 1958 |
| 2,827,446 | Breslow et al. | Mar. 18, 1958 |
| 2,862,917 | Anderson et al. | Dec. 2, 1958 |
| 2,905,645 | Anderson et al. | Sept. 22, 1959 |
| 2,943,063 | Eby et al. | June 28, 1960 |

FOREIGN PATENTS

| | | |
|---|---|---|
| 533,362 | Belgium | Nov. 16, 1954 |
| 534,792 | Belgium | Jan. 31, 1955 |